United States Patent [19]
Good

[11] 4,183,254
[45] Jan. 15, 1980

[54] DRIVE REDUCER FOR TAPE RECORDER

[75] Inventor: David M. Good, Rochester, N.Y.

[73] Assignee: Tapecon, Inc., Rochester, N.Y.

[21] Appl. No.: 860,749

[22] Filed: Dec. 15, 1977

[51] Int. Cl.² .................... F16H 13/02; F16H 55/32; F16D 69/00
[52] U.S. Cl. .......................... 74/206; 74/214; 360/2; 274/39 A
[58] Field of Search ................ 360/2, 15, 88, 94; 274/39 A; 74/204, 201, 194, 214, 206, 215, 216, 196, 197

[56] References Cited

U.S. PATENT DOCUMENTS

| | | | |
|---|---|---|---|
| 2,111,422 | 3/1938 | Fawick | 74/215 |
| 2,281,277 | 4/1942 | FitzGerald | 74/214 |
| 2,781,667 | 2/1957 | Giskes | 74/214 |
| 2,907,071 | 10/1957 | Lichten | 74/215 |
| 3,190,133 | 6/1965 | Foufounis | 74/204 |
| 3,872,500 | 3/1975 | Wild | 360/94 |
| 3,872,501 | 3/1975 | McPherson | 360/88 |
| 4,114,831 | 9/1978 | Johnson | 74/204 |

FOREIGN PATENT DOCUMENTS

| | | | |
|---|---|---|---|
| 158885 | 9/1954 | Australia | 74/216.5 |
| 214094 | 7/1908 | Fed. Rep. of Germany | 74/204 |
| 1230302 | 12/1966 | Fed. Rep. of Germany | 74/194 |
| 1082091 | 5/1960 | Fed. Rep. of Germany | 74/204 |
| 27176 | 8/1954 | Finland | 274/39 A |
| 876945 | 11/1942 | France | 74/215 |
| 71704 | 9/1959 | Netherlands | 274/39 A |

*Primary Examiner*—Samuel Scott
*Assistant Examiner*—William R. Henderson
*Attorney, Agent, or Firm*—Stonebraker, Shepard & Stephens

[57] ABSTRACT

A drive reducer for a tape recorder accomplishes a large reduction from the surface speed of a motor-driven shaft to the surface speed of a drive element for advancing a tape media such as a magnetic recording tape on a flat card. A cup-shaped element is fixed to a reducer shaft and positioned so that the inner surface of a cylindrical outer wall engages the motor-driven shaft. An idler wheel freely rotatable on the reducer shaft is positioned radially inside the cup-shaped element and is formed of compressible material with a diameter large enough for compressibly engaging the motor-driven shaft and pressing it against the inner surface of the outer wall of the cup-shaped element. Rotation of the reducer shaft is transferred to the driven element preferably by a friction sleeve on the reducer shaft and a friction disk engaging the sleeve and turning a shaft supporting the driven element.

6 Claims, 2 Drawing Figures

DRIVE REDUCER FOR TAPE RECORDER

BACKGROUND OF THE INVENTION

Drive reducers for tape recorders are especially important for linear magnetic strips arranged on flat cards, photographs, or other generally planar supports offering only a relatively short length of tape recording medium. To record the longest possible message on such a limited length of recording tape, it is important to drive the tape past a magnetic head as slowly as practical. Also, a tape drive must be uniform, smooth, and vibration free to a constant speed to preserve the fidelity of the recording and playback. A drive reducer for a tape recorder must also be economical, compact, reliable, and long-lived.

The best prior art drive reducer for a tape recorder as known to applicant is shown in U.S. Pat. No. 3,872,501 issued to Donald F. McPherson on Mar. 18, 1975 and entitled DRIVE FOR A LINEAR PLAY ADAPTER FOR A CASSETTE TAPE RECORDER. The drive reducer of this patent was suggested for an adapter for a tape recorder, but it could also be used for any tape recorder using a relatively slow advance rate for the tape recording medium.

The present invention improves over the prior art in making a drive reducer that is more compact and also smoother and more vibration free and has a simpler configuration with fewer moving parts to result in improved economy, reliability, and longevity. The inventive improvement also applies to both independent tape recorders and adapters or accessories for tape recorders and is especially useful wherever a relatively slow and vibration free advance of a tape recording medium is desired.

SUMMARY OF THE INVENTION

The inventive drive reducer applies to a tape recorder having a motor, a shaft driven by the motor, and a driven element; and the drive reducer is arranged between the motor-driven shaft and the driven element. It includes a reducer shaft and a generally cup-shaped element fixed to the reducer shaft and having a cylindrical outer wall with a radially inner surface formed of a friction material and positioned to engage the motor-driven shaft. An idler wheel is mounted for freely rotating on the reducer shaft radially inward of the outer wall of the cup-shaped element, and the idler wheel is formed of compressible material and has a diameter large enough so that it compressibly engages the motor-driven shaft and presses the motor-driven shaft against the inner surface of the outer wall of the cup-shaped element. Rotation of the reducer shaft derived from the motor-driven shaft and the cup-shaped element is transferred to the driven element to advance a tape recording medium.

DRAWINGS

FIG. 1 is a partially cross-sectioned, fragmentary elevational view of a preferred embodiment of the inventive drive reducer; and FIG. 2 is a fragmentary cross-sectional view of the drive reducer FIG. 1 taken along the line 2—2 thereof.

DETAILED DESCRIPTION

Figure 1:
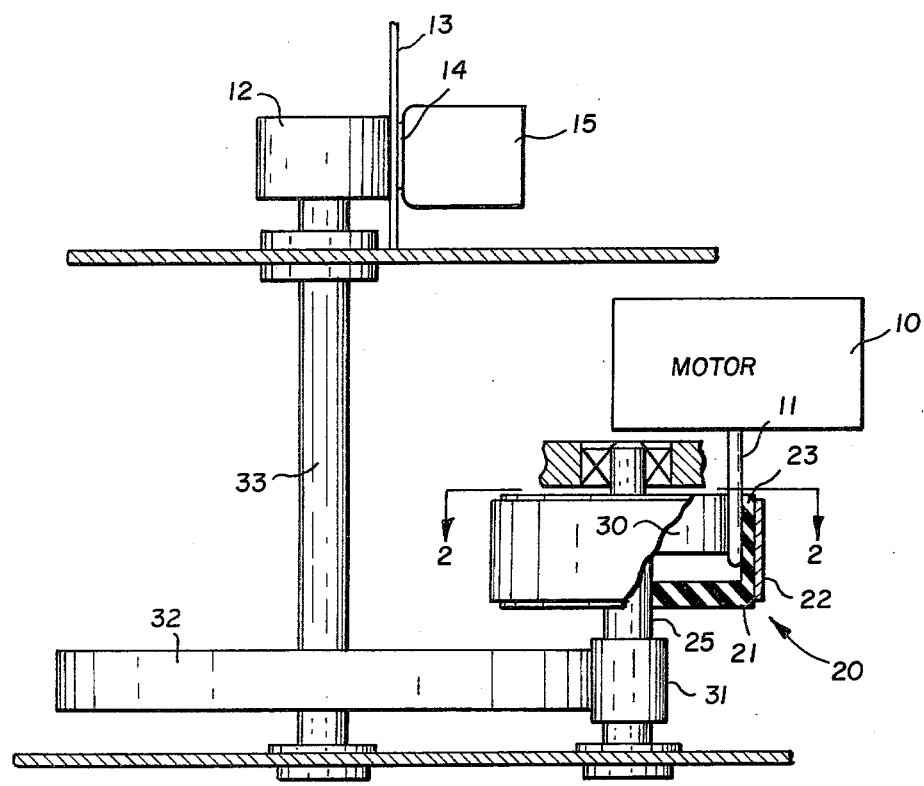
Figure 2:
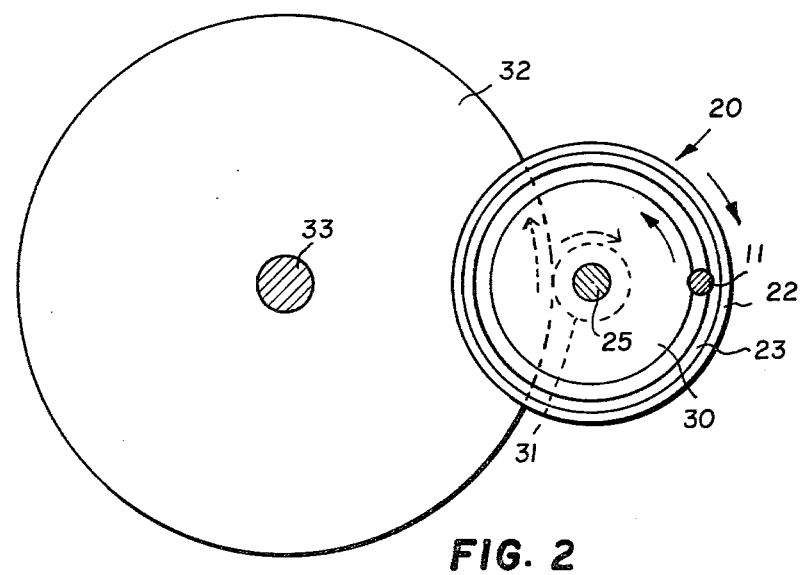

The illustrated drive reducer begins with the rotational surface speed of a shaft 11 driven by a motor 10 and ends with a driven element or wheel 12 rotating with a substantially slower surface speed for slowly advancing a card 13 bearing a recording tape strip 14 for slow and uniform movement past a magnetic head 15 for recording or playback. Motor 10 driving shaft 11 can be in a tape recorder with the inventive drive reducer arranged in an adapter that piggy-backs onto the tape recorder for playing and recording with cards 13 bearing strips 14, or motor 10 and its shaft 11 can be an integral part of a tape recorder or tape recorder accessory especially made for slowly advancing a tape recording medium such as strip 14. The invention can be used for recording strips other than ones arranged on flat cards and offers an economical and reliable way of achieving a slow and smooth advance of a tape recording medium wherever this feature is desired.

Many generally known details of tape recorders and adapters or accessories for tape recorders have been omitted to simplify the description of the invention. Also, some of the illustrated components are shown schematically because they fall within the skill of workers in the art.

A generally cup-shaped element 20 is fixed to a reducer shaft 25 so that cup 20 and shaft 25 rotate together. A hub portion 21 of cup element 20 is preferably formed of an elastomeric material such as rubber, and cup 20 has a generally cylindrical outer wall formed of a metallic, cylindrical sleeve 22 and a radially inner surface 23 formed of a friction material that is preferably elastomeric and compressible, such as rubber. Element 20 can be molded of a rubber material to form hub portion 21 fixed to shaft 25 and the inner surface 23 of the outer cylindrical wall secured to metallic sleeve 22. Hub portion 21 provides a resilient connection between the outer wall of element 20 and shaft 25 for absorbing or dampening vibration. An element similar to cup-shaped element 20 is also suggested in U.S. Pat. No. 3,872,501.

Cup element 20 is positioned so that frictional inner surface 23 engages the rotating surface of shaft 11 as illustrated. An idler roller or wheel 30 is freely rotatable on shaft 25 and mounted radially inside element 20 as illustrated. Idler wheel 30 is formed of compressible and preferably elastomeric material such as rubber and has a diameter large enough so that it compressibly engages shaft 11 and presses shaft 11 against friction material 23 around the inner surface of the outer wall of element 20. The normal clearance between the cylindrical periphery of idler roller 30 and the inner periphery of friction material 23 on the outer wall of element 20 is less than the diameter of shaft 11. The compressible materials of idler wheel 30 and the inner portion 23 of the wall of cup 20 are preferably each deformed slightly where they engage shaft 11, which is securely trapped between the two friction materials for reliably and smoothly transferring its rotation to cup element 20 and shaft 25. Idler wheel 30 rotates counter to the direction of cup element 20 as shown by the arrows.

Using freely rotatable and compressible idler wheel 30 for transferring the rotation from shaft 11 to cup element 20 has several important advantages. The structure is compact, because idler wheel 30 fits within space available inside cup element 20. It also eliminates any need for a pinch roller or pressure roller outside of cup 20 and any associated pinch roller mount requiring a pivot arm and a bias spring, and this economizes by eliminating several parts. The compressibility of the material of idler wheel 30 allows it to be made large enough for a reliable compressive fit while insuring a long wear life. Pressure and stress on drive shaft 11 is equally balanced so that the bearings of motor 10 are not loaded toward one direction, and this lengthens the bearing life and also helps smooth out the drive. The coefficient of friction, and compressibility or hardness durometer of idler wheel 30 and friction ring 23 are preferably made approximately equal so that the frictional loading or resistance on each side of shaft 11 is balanced and equal. Self alignment between idler wheel 30 and cup element 20 is automatic and readily achievable, and the balanced loading allows rotational elements to track truly without stresses from misalignment.

The inventive arrangement is not only smooth and vibration free but can accomplish a substantial speed reduction from shaft 11 to shaft 25, and even greater speed reduction can readily be taken from shaft 25. As illustrated in the drawings, a preferred way of doing this is with a compressible sleeve 31 preferably formed of an elastomeric material such as rubber formed to encircle and rotate with shaft 25 and a friction disk 32 fixed to a shaft 33 to engage sleeve 31. Shaft 33 rotationally supports drive element or wheel 12 for smoothly rotating at far fewer rpm than either shaft 25 or shaft 11. The invention readily allows a reduction from 2,000 rpm to 10 rpm without sacrificing smoothness and evenness or introducing vibration sufficient to impair the practicality of tape recording and playback. Friction wheel 32 can be formed of metal such as aluminum or steel and has sufficient mass to have a fly wheel effect helping to eliminate vibrations.

I claim:

1. A drive reducer for a tape recorder having a motor, a shaft driven by said motor, a driven element, a reducer shaft, a generally cup-shaped element fixed to said reducer shaft and having a cylindrical outer wall with a radially inner surface formed of a friction material and positioned to engage said motor-driven shaft, and means for transferring rotation of said reducer shaft derived from said motor-driven shaft and said cup-shaped element to said driven element, said drive reducer comprising:
   a. an idler wheel concentric with said cup-shaped element and arranged within said outer wall of said cup-shaped element;
   b. said idler wheel being freely rotatable on said reducer shaft;
   c. said idler wheel having a radius slightly larger than the distance from the axis of said reducer shaft to the surface of said motor-driven shaft to leave an annular space narrower than the diameter of said motor-driven shaft between said idler wheel and said outer wall of said cup-shaped element; and
   d. said idler wheel being formed of compressible material compressibly engaging said motor-driven shaft and pressing said motor-driven shaft against said inner surface of said outer wall of said cup-shaped element.

2. The drive reducer of claim 1 wherein said rotation transferring means includes a sleeve of compressible material on said reducer shaft, a friction disk engaging said sleeve, and a shaft rotationally supporting said driven element and said friction disk.

3. The drive reducer of claim 1 wherein said friction material of said inner surface of said outer wall and said compressible material of said idler wheel are both elastomeric.

4. The drive reducer of claim 3 wherein said elastomeric materials of said idler wheel and said inner surface of said outer wall have approximately equal durometers.

5. The drive reducer of claim 1 wherein said rotation transferring means includes a sleeve of compressible material on said reducer shaft, a friction disk engaging said sleeve, and a shaft rotationally supporting said driven element and said friction disk and wherein said friction material of said inner surface of said outer wall and said compressible material of said idler wheel are both elastomeric.

6. The drive reducer of claim 5 wherein said elastomeric materials of said idler wheel and said inner surface of said outer wall have approximately equal durometers.

* * * * *